US 9,972,011 B2

United States Patent
Hey et al.

(10) Patent No.: US 9,972,011 B2
(45) Date of Patent: May 15, 2018

(54) SYSTEMS AND METHODS FOR MONITORING AUTHENTICATION OF TRANSACTIONS TO PAYMENT NETWORKS

(71) Applicant: MASTERCARD INTERNATIONAL INCORPORATED, Purchase, NY (US)

(72) Inventors: Mark Hey, St. Peters, MO (US); Anand Mallepally, O'Fallon, MO (US); Paul Baker, Shipley (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 455 days.

(21) Appl. No.: 14/825,587

(22) Filed: Aug. 13, 2015

(65) Prior Publication Data

US 2017/0046701 A1 Feb. 16, 2017

(51) Int. Cl.
*G06Q 20/40* (2012.01)

(52) U.S. Cl.
CPC ................... *G06Q 20/405* (2013.01)

(58) Field of Classification Search
CPC .................................................. G06Q 20/405
USPC .......................................................... 705/44
See application file for complete search history.

(56) References Cited

U.S. PATENT DOCUMENTS

| | | | | |
|---|---|---|---|---|
| 2012/0018506 A1* | 1/2012 | Hammad | ................. | G06F 21/34 235/375 |
| 2014/0258125 A1* | 9/2014 | Gerber | .................... | G06Q 20/02 705/44 |
| 2016/0034900 A1* | 2/2016 | Nelsen | ............... | G06Q 20/4016 705/44 |
| 2016/0321652 A1* | 11/2016 | Dimmick | .............. | H04L 63/083 |
| 2017/0286656 A1* | 10/2017 | Kohli | ...................... | G06F 21/32 |

* cited by examiner

*Primary Examiner* — Jagdish Patel
(74) *Attorney, Agent, or Firm* — Harness, Dickey & Pierce, P.L.C.

(57) ABSTRACT

Systems and methods for use in monitoring authentication messaging associated with payment account transactions are disclosed. One exemplary method includes monitoring authentication messaging from a merchant plug-in (MPI) associated with at least one merchant. The authentication messaging is related to one or more consumers attempting transactions to payment accounts at the at least one merchant. The exemplary method further includes, for each authentication message received from the MPI, transmitting the authentication message to an access control server (ACS) when an issuer associated with the payment account at issue is a participant in an authentication service, monitoring, by the computing device, response messaging from the ACS, each response message associated with a transaction and generated in response to an authentication messages from the MPI, and generating, by the computing device, at least one flag, when a condition associated with the authentication messages and/or the response messages is abnormal.

20 Claims, 3 Drawing Sheets

SYSTEMS AND METHODS FOR MONITORING AUTHENTICATION OF TRANSACTIONS TO PAYMENT NETWORKS

FIELD

The present disclosure generally relates to systems and methods for monitoring authentication of transactions to payment networks, and in particular, to monitoring messaging involved in consumer authentication for transactions, and specifically, virtual store-front transactions.

BACKGROUND

This section provides background information related to the present disclosure which is not necessarily prior art.

Payment accounts are used by consumers to perform numerous different transactions including, for example, purchasing products (e.g., goods and/or services) from merchants, etc. In certain instances, unauthorized persons or entities attempt to use payment accounts to cause unauthorized transactions. As such, merchants to which purchase transactions are directed and issuers of payment accounts employ authentication and authorization techniques to limit the number of unauthorized purchase transactions. For example, consumer signatures are compared to reference signatures on the back of payment cards, and/or personal identification numbers (PINs) are used to facilitate authorization of the purchase transactions. It is further known for the issuers, and/or payment networks through which the transactions are routed, to offer additional authentication services for particular types of transactions, such as, for example, Internet transactions. One example service includes 3 Domain Secure (3DS) protocols, by which consumers enter consumer-specific identifiers to an issuer-provided prompt before online transactions can be authorized.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Transaction data is often compiled by payment networks, for example, in connection with payment device transactions by consumers at merchants. Authentication of the consumers by various means may be employed to enhance security of payment account usage and reduce the number of unauthorized transactions. That said, consumers have come to expect certain performance for authentication and/or authorization when using payment accounts to fund transactions. The systems and methods herein provide unique monitoring of enhanced authentication provided by a payment network at a merchant's store-front for web-based transactions with consumers, from which performance of particular messaging, and the authentication process in general, may be determined. In particular, authentication messaging from certain of the merchants, the issuers, and/or intermediaries (associated with the merchants/issuers) is monitored to identify abnormal and/or underperforming messaging, which is flagged for further investigation and/or rectification, by the payment network. In this manner, the payment network may safeguard the performance and integrity of the authentication service, thereby continuing to offer enhanced authentication (e.g., 3 Domain Secure (3DS) protocols, etc.), prior to permitting transactions, while substantially ensuring the consumer experience.

Figure 1:
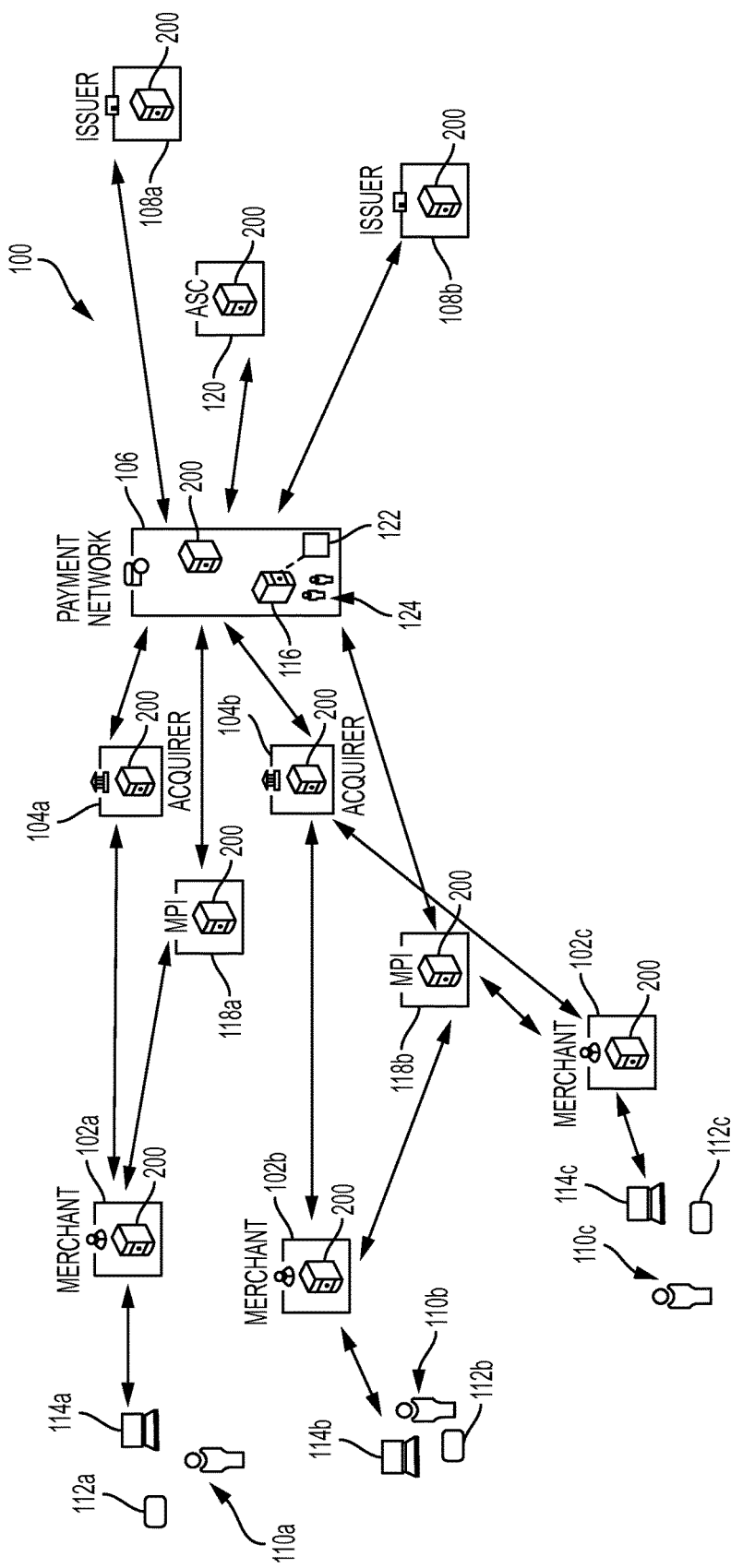
FIG. 1 shows an exemplary system for monitoring authentication messaging at a directory server, and including one or more aspects of the present disclosure.

FIG. 1 illustrates an exemplary system 100 in which one or more aspects of the present disclosure may be implemented. Although parts of the system 100 are presented in one arrangement, it should be appreciated that other exemplary embodiments may include the same or different parts arranged otherwise, depending on, for example, processing of payment transactions, use of authentication processes, etc.

As shown in FIG. 1, the illustrated system 100 generally includes merchants 102a-c, acquirers 104a-b, a payment network 106, and issuers 108a-b, each coupled to one or more networks. Regardless of the arrangement of the one or more networks, or even the number of networks in FIG. 1, network connections are indicated by arrowed lines between the various particular parts of the system 100. The networks may include, without limitation, wired and/or wireless networks, local area networks (LANs), wide area networks (WANs) (e.g., the Internet, etc.), mobile networks, and/or another suitable public and/or private networks capable of supporting communication among two or more of the illustrated parts of the system 100, or any combination thereof. In one example, one of the networks includes multiple networks, where different ones of the multiple networks are accessible to different ones of the illustrated parts in FIG. 1. In particular in this example, the acquirers 104a-b, the payment network 106, and the issuers 108a-b may be connected via a private network for processing payment transactions, and the merchants 102a-c may be connected with one or more consumers, for example, through a public network, such as the Internet.

Each of the merchants 102a-c provides products (e.g., good and services), at physical store-front locations (e.g., brick-and-mortar stores, etc.) and/or through virtual store-front locations (e.g., websites, web-based applications, etc.). The present disclosure is presented with specific reference to card-not-present transactions at virtual store-front locations of the merchants 102, but should not be understood to be limited to such transactions.

In addition, the system 100 further includes multiple consumers 110a-c, which may include a variety of different individuals and/or entities that purchase products from the merchants 102a-c illustrated in FIG. 1. Each consumer 110a-c is associated with at least one payment account, which is issued by one of issuers 108a-b. The payment accounts are each associated with one of payment devices 112a-c, which may be used, as described below, to permit the consumers 110a-c to fund the transactions for products through their payment accounts. In this exemplary embodiment, the payment accounts are each further associated with at least one enhanced authentication service, which requires the consumers 110 to enter codes or other identifiers known to the consumers 110, prior to conventionally authorizing transactions between one of the acquirers 104 and issuers 108, as described below. The enhanced authentication service may include, for example, one or more 3DS protocols, such as, for example, SecureCode® by MasterCard, Verified® by VISA, Safekey® by American Express, etc. The consumers 110 in FIG. 1 are also associated with communication devices 114a-c, which may be used, by the consumers 110a-c, to facilitate network transactions (e.g., via the Internet, etc.), or card-not-present transactions, with the merchants 102a-c., using the payment devices 112a-c, respectively.

The system 100 includes additional parts, which participate in the enhanced authentication services provided with the payment devices 112a-c, when used for certain transactions (e.g., card-not-present transactions, etc.). In particular, the system 100 includes a directory server 116, which is illustrated as part of the payment network 106. It should be appreciated, however, that the directory server 116 may be separate from the payment network 106 in other system embodiments, yet associated therewith. The system 100 further includes multiple merchant plug-ins (MPI's) 118a-b and an access control server (ACS) 120. As shown, each is coupled to the payment network 106, and in particular to the directory server 116, via one or more network connections (indicated by the arrowed lines). The MPI's 118a-b are separate entities from the merchants 102a-c in this embodiment, yet coupled thereto via one or more network connections to provide authentication messaging (to/from the merchants 102a-c) as described herein. Further, as shown, the MPI 118b provides service to not only merchant 102b, but also merchant 102c. The ACS 120 is further coupled to the issuers 108a-b, whereby the ACS 120 provides authentication messaging (on behalf of the issuers 108a-b) as described herein.

It should be appreciated that only two MPI's 118 and only one ACS 120 are included in the system 100 for ease of illustration, and that any number of MPI's and ACS's may be included in other system embodiments. Further, the MPI's and ACS's are illustrated as separate from the merchants 102 and the issuers 108. Often, MPI's and ACS's are intermediaries separate from the merchants and issuers, respectively, i.e., third party vendors. Nonetheless, in certain embodiments, MPI's and/or ACS's may be integrated with the merchants 102, the acquirers 104, and/or the issuers 108. Further, in at least one embodiment, MPI's and/or ACS's, or certain aspects thereof, may be integrated with the payment network 106, or parts thereof.

For purposes of illustration, a transaction is described below with reference to the consumer 110a and merchant 102a. It should be understood that transactions in the system 100, from consumers 110b-c, and/or directed to merchants 102b-c will be substantially consistent.

When the consumer 110a presents the payment device 112a for a purchase transaction at merchant 102a, the merchant 102a reads the payment device 112a to identify the payment account. Because the transaction is being attempted at the virtual store-front of the merchant 102a, in this example, the transaction is directed to the MPI 118a. In turn, the MPI 118a transmits an authentication message (also potentially referred to as a verification request or verification request message) to the directory server 116. The directory server 116 then determines if the payment account as associated with an issuer (e.g., issuer 108a), which is a participant in the enhanced authentication service. If issuer 108a is a participant, the directory server 116 searches in memory for the ACS (e.g., ACS address, etc.) associated with the issuer 108a (e.g., ACS 120) and then transmits the authentication message to the ACS 120. The authentication message transmitted by the directory server 116 to the ACS 120 may include the exact message received from the MPI 118a, a modified version of the message, or a new message incorporating the original authentication message from the MPI 118a and/or details associated therewith. In response, the ACS 120 verifies whether or not the particular payment account associated with the consumer 110a is enrolled in the enhanced authentication service. If yes, the ACS 120 provides a response message (including a verified indicator) back through the directory server 116 to the MPI 118a. If no, the ACS 120 provides a response message (including a non-verified indicator) back through the directory server 116 to the MPI 118a. The response message transmitted by the directory server 116 to the MPI 118a may be the exact message received from the ACS 120, may be a modified version of the message, or may be a new message incorporating the original response message from the ACS and/or details associated therewith.

Upon receipt of the response message (with a verified indicator) from the ACS 120, the MPI 118a sends a consumer authorization request to the virtual store-front of merchant 102a. The virtual store-front then communicates with the ACS 120 to perform authentication of the consumer 110a. In particular, an interface is displayed, as part of, or in a separate interface to, the virtual store-front, which prompts the consumer 110a to enter a code or other identifier particular to the consumer 110a. In response to the code (or other identifier), the ACS 120 confirms the code and then generates an accountholder authentication value (AAV), which is transmitted to the MPI 118a, at which point the interface from the ACS 120 is closed. The MPI 118a then provides the AAV to the merchant 102a, and in particular, the merchant's virtual store-front. If the code is not confirmed, however, the consumer 110a may be given an additional opportunity (or multiple additional opportunities) to submit the correct code. When the additional opportunity expires, and at discretion of the ACS 120, the merchant 102a then is prompted to decide whether to abort the transaction or submit it for authorization (with full fraud responsibility if the transaction is later determined to be fraudulent). It should be appreciated that the enhanced authentication service, described above, may be different in other embodiments, but is preferably performed apart from a conventional payment account authorization process between the consumer 110a, the merchant 102a, the acquirer 104a, and the issuer 108a.

Next, based on the authentication of the consumer 110a, the merchant 102a generates an authorization request, to determine if the consumer's payment account is in good standing and if there is/are sufficient credit/funds to authorize the transaction. The authorization request includes, among other things, a payment account number, an amount of the transaction, and the AAV received from the enhanced authentication service. The authorization request is sent form the merchant 102a to the acquirer 104a. In turn, the acquirer 104a communicates the authorization request to the issuer 108a, via the payment network 106. The issuer 108a may then validate the AAV, and other aspects of the authorization request to determine whether to authorize the transaction. Regardless, the issuer 108a sends an authorization response back through the payment network 106 to the acquirer 104*a,* which is then provided back to the merchant 102*a.* If the transaction is authorized, the credit line or funds associated with the payment account of the consumer 110*a,* depending on the type of account, is then decreased by the amount of the purchase, and the charge is posted to the account associated with the payment device 112*a.* The transaction is later cleared and settled by and between the merchant 102*a* and the acquirer 104*a* and by and between the acquirer 104*a* and the issuer 108*a* (in accordance with a settlement arrangement, etc.).

While the messages herein are described with reference to and are directed to and from the MPI's 118 and/or ACS 120, it should be appreciated that other messages related to a 3DS protocol, for example, or other security protocol, may be passed among the parts of the system 100, and be subjected to the methods herein.

Figure 2:
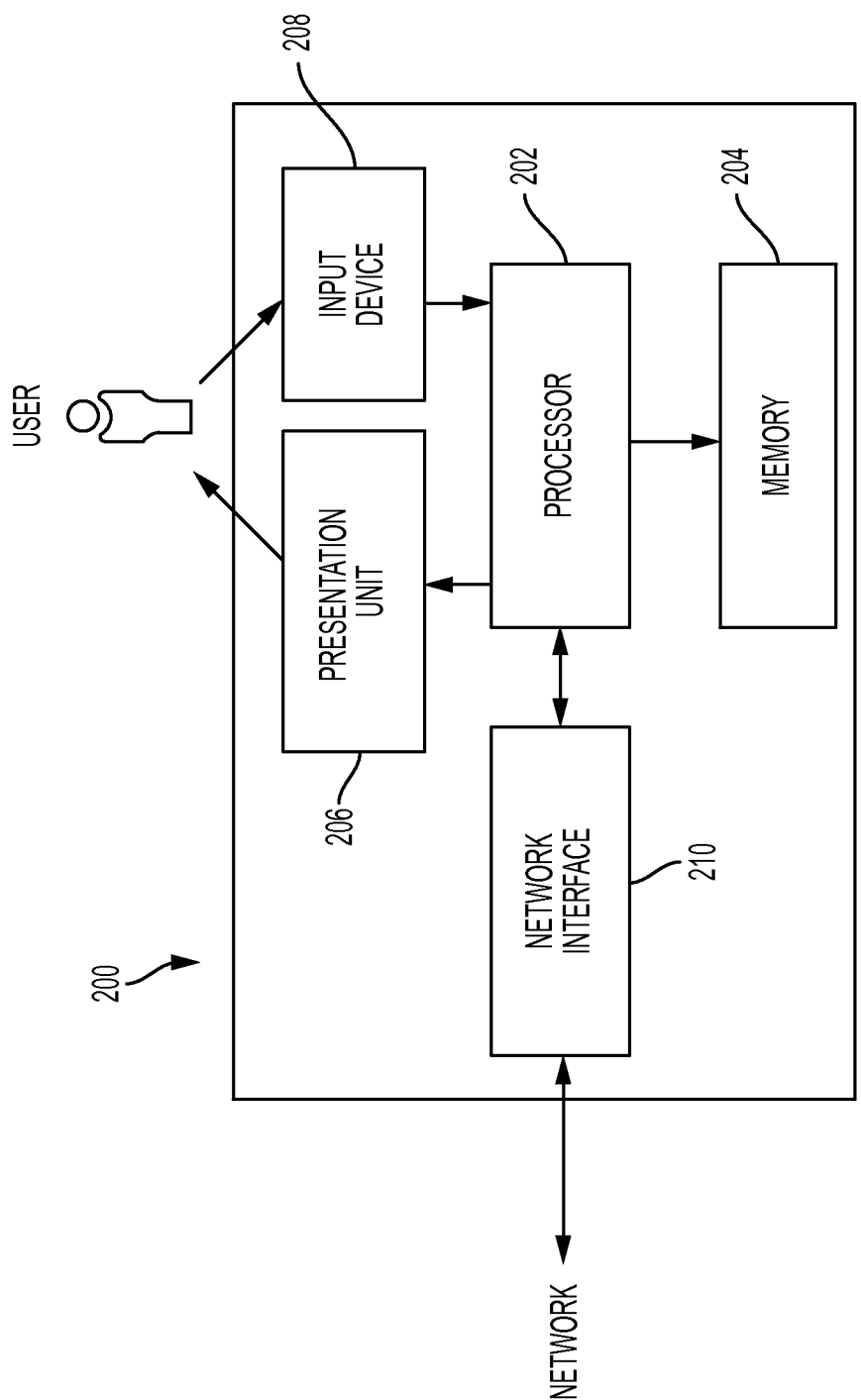
FIG. 2 is a block diagram of an exemplary computing device, suitable for use in the system of FIG. 1.

FIG. 2 illustrates an exemplary computing device 200 that can be used in the system 100. The computing device 200 may include, for example, one or more servers, workstations, personal computers, laptops, tablets, smartphones, other suitable computing devices, etc. In addition, the computing device 200 may include a single computing device, or it may include multiple computing devices located in close proximity, or multiple computing devices distributed over a geographic region, so long as the computing devices are specifically configured to function as described herein. In the system 100, each of the merchants 102, the acquirers 104, the payment network 106, the issuers 108, the MPI's 118, and the ACS 120 are illustrated as including, or being implemented in, computing device 200. Also in the system 100, the communication devices 114 associated with the consumers 110, and the directory server 116 are each consistent with computing device 200. Nonetheless, the system 100 should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 generally includes a processor 202 and a memory 204 coupled to the processor 202. The processor 202 may include one or more processing units (e.g., in a multi-core configuration, etc.) including, without limitation, a central processing unit (CPU), a microcontroller, a reduced instruction set computer (RISC) processor, an application specific integrated circuit (ASIC), a programmable logic circuit (PLC), a gate array, and/or any other circuit or processor capable of the functions described herein. The above examples are exemplary only, and are not intended to limit in any way the definition and/or meaning of processor.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204, and/or data structures included therein, may be configured to store, without limitation, transaction data, authentication codes, AAV's, certificates, interfaces, and/or other types of data and/or information suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. It should be appreciated that the memory 204 may include a variety of different memories, each implemented in one or more of the functions or processes described herein.

The computing device 200 also includes a presentation unit 206 (or output device or display device) that is coupled to the processor 202 (however, it should be appreciated that the computing device 200 could include output devices other than the presentation unit 206, etc.). The presentation unit 206 outputs information, either visually or audibly to a user of the computing device 200, for example, a consumer (e.g., one of the consumers 110), a payment network analyst user 124, individuals associated with other parts of the system 100, etc. It should be further appreciated that various interfaces (e.g., authentication requests, etc.) may be displayed at computing device 200, and in particular at presentation unit 206, to display information, such as, for example, authentication requests, flagged MPI's or ACS's, etc. The presentation unit 206 may include, without limitation, a liquid crystal display (LCD), a light-emitting diode (LED) display, an organic LED (OLED) display, an "electronic ink" display, etc. In some embodiments, presentation unit 206 includes multiple devices.

The computing device 200 further includes an input device 208 that receives inputs from the user of the computing device 200 (i.e., user inputs) such as, for example, authentication codes, etc. The input device 208 is coupled to the processor 202 and may include, for example, a keyboard, a pointing device, a mouse, a stylus, a touch sensitive panel (e.g., a touch pad or a touch screen, etc.), another computing device, and/or an audio input device. In various exemplary embodiments, a touch screen, such as that included in a tablet, a smartphone, or similar device, behaves as both a presentation unit 206 and an input device 208.

In addition, the illustrated computing device 200 also includes a network interface 210 coupled to the processor 202 and the memory 204. The network interface 210 may include, without limitation, a wired network adapter, a wireless network adapter, a mobile network adapter, or other device capable of communicating to one or more different networks, including the network 110. Further, in some exemplary embodiments, the computing device 200 includes the processor 202 and one or more network interfaces incorporated into or with the processor 202.

Referring again to FIG. 1, the payment network 106 further includes a compliance engine 122 associated with the directory server 116. While the engine 122 is illustrated as separate, it should be appreciated that it may be incorporated in the directory server 116, as indicated by the dotted lines. Still further, however, the compliance engine 122 may be disposed elsewhere, as a standalone device, and/or integrated elsewhere within the system 100, including, for example, in one or more of the MPI's 118 and/or the ACS 120, etc.

The compliance engine 122 is configured to monitor messages from the MPI's 118 and/or the ACS 120 to determine if messages satisfy response time requirements, form patterns indicative of problems/abnormalities, and/or are otherwise unusual and/or degraded, etc. In particular, for example, compliance engine 122 is configured to check for no responses from the MPI's 118 and/or the ACS 120, or slow responses from the MPI's 118 and/or the ACS 120, or suspicious patterns of verified or non-verified transactions (e.g., all transaction within a 5-minute interval of being verified, etc.), etc. The compliance engine 122 is further configured, in certain embodiments, to perform such checks in general or specific to certain regions, in which the MPI's 118 and/or the ACS 120 are employed. The compliance engine 122 may additionally be configured to confirm connectivity with one or more of the MPI's 118 and/or the ACS 120.

When the compliance engine 122 detects any of the above conditions, the compliance engine 122 is configured to generate a flag, which may include different degrees of severity, depending on the condition. The compliance engine 122 is configured to append, to the flag, additional detail about the condition including, without limitation, the certificate identifier or ID, time stamp, description of the condition triggering the flag, etc. Moreover, the compliance engine 122 is configured to store the condition and/or flag in a data structure, or log of events, associated with the compliance engine 122 and stored in memory (e.g., memory 204 of the directory server 116, etc.). Furthermore, as shown in FIG. 1, one or more of the analyst users 124 are disposed at the payment network 106, and in particular, associated with the compliance engine 122 to receive the flags therefrom, via one or more computing devices (not shown). The analyst users 124 may take suitable action in response to the flag, including, without limitation, send reports to the respective MPI's 118 and/or the ACS 120, issue warnings to the respective MPI's 118 and/or the ACS 120, and, in some instances, alter the MPI's 118 and/or the ACS 120 involved in the enhanced authentication service. For example, the analyst user 124 may route authentication messaging to the ACS 120, or to other ACS's, or to ACS's in a different region, etc. when a particular ACS in a region is having difficulties. Further, the compliance engine 122 may be configured to transmit the flag to a portable communication device (not shown) associated with the analyst user 124 (e.g., a smartphone, cellular phone, pager, etc.).

It should be appreciated that the MPI's 118 and the ACS 120 may comprise any computing devices and/or any protocols (e.g., including, but not limited to, 3DS protocols, etc.) within the scope of the present disclosure, for example, that take part in authenticating consumers prior to permitting/authorizing purchase transactions by the consumers at merchants.

Figure 3:
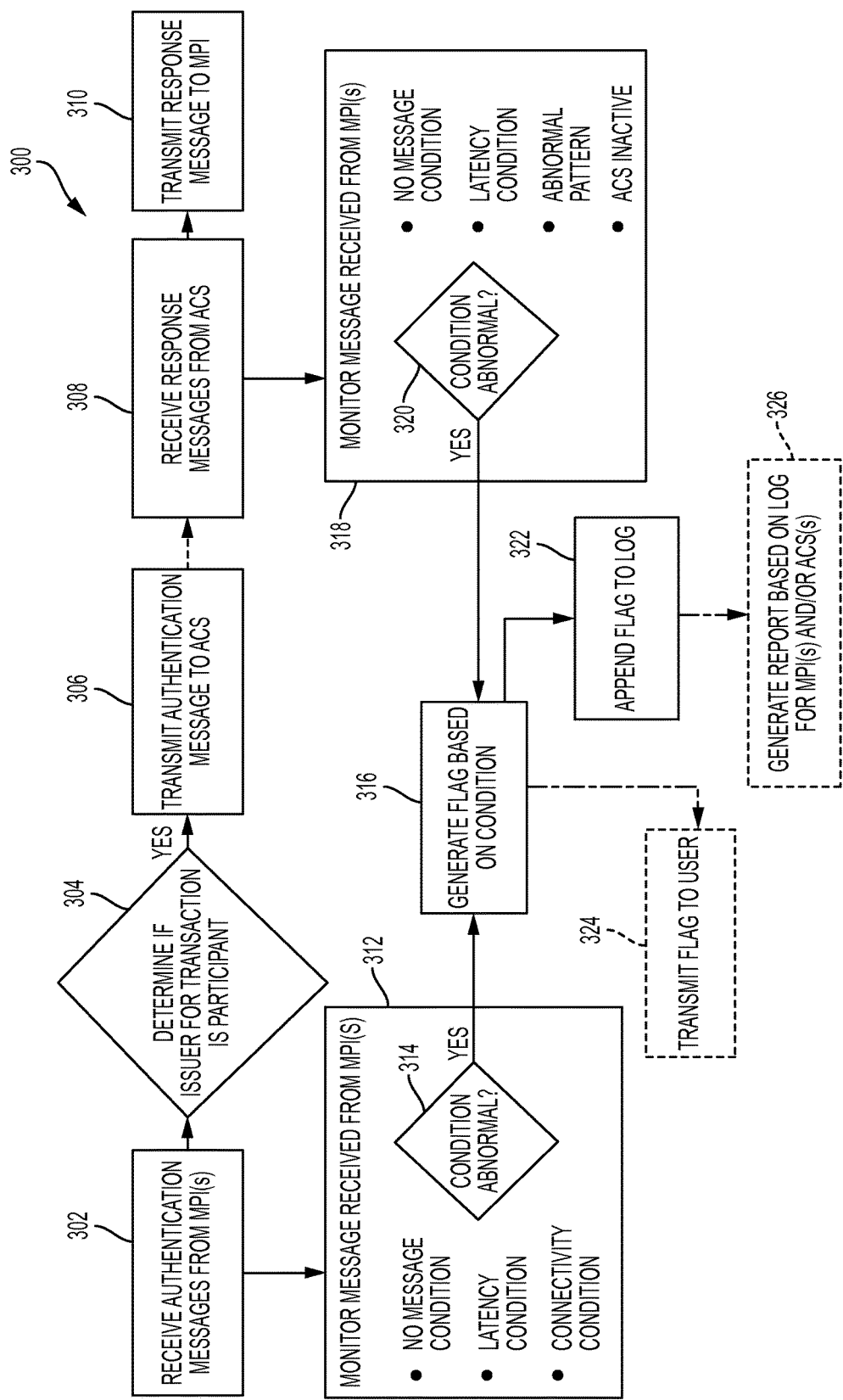
FIG. 3 is a flowchart of an exemplary method, which can be implemented via the system of FIG. 1, for monitoring authentication messaging from merchant plug-ins and/or access control servers.

FIG. 3 illustrates an exemplary method 300 for use in monitoring authentication messaging for transactions to payment networks. The exemplary method 300 is described as implemented in the payment network 106 and, more particularly, in the directory server 116 and/or in the compliance engine 122. Further, for purposes of illustration, the exemplary method 300 is described herein with reference to other parts of the system 100 and the computing device 200. As should be understood, however, the methods herein should not be understood to be limited to the exemplary system 100 or the exemplary computing device 200, and the systems and the computing devices herein should not be understood to be limited to the exemplary method 300.

As payment devices 112*a-c* are used by the consumers 110*a-c* to facilitate funding of transactions, MPI's 118 cooperate with the merchants 102*a-c* to transmit authentication messages to the directory server 116. Each one of the authentication message is specific to a transaction to a payment account, for which the above described enhanced authentication service is active.

In response to each of the authentication messages, the directory server 116 receives the message, at 302. In turn, the directory server 116 determines, at 304, whether the issuer 108*a-b* associated with the payment account to be used to fund the transaction is a participant in the enhanced authentication service. If yes, the directory server 116 transmits, at 306, the authentication message to ACS 120 associated with the payment account. The ACS 120 determines whether the payment account is an account participating in the enhanced authentication service, and if it is, transmits a response message back to the directory server 116. The response message includes a verified or non-verified indicator. In turn (as indicated by the dotted lines in FIG. 3), the directory server 116 receives the response message, at 308, and then transmits the response message to the corresponding one of the MPI's 118, at 310.

It should be appreciated that in authenticating the consumers 110*a-c* and/or the payment devices 112*a-c*, one or more additional messages having the same or different content may be exchanged between the directory server 116 and the MPI's 118 and/or the ACS 120. It should further be appreciated that the directory server 116, in numerous embodiments, receives hundreds, if not hundreds of thousands, of messages described herein, to/from the MPI's 118 and/or the ACS 120, per hour.

Separately, the compliance engine 122 monitors the authentication messaging from the MPI's 118, at 312. In particular, the compliance engine 122 is monitoring conditions of the authentication messaging, including, without limitation, as shown in FIG. 3, whether no message has been received from the MPI's 118 within a defined interval, or whether the latency defined by the authentication messaging is above or below one or more defined thresholds, or whether no connectivity with the MPI's 118 exists, etc.

In connection with monitoring the connectivity condition, the MPI's 118 go through one or more processes of connectivity testing during onboarding and/or certification operations. Based on such testing, the engine 122 monitors the intervals in which the MPI's 118 send messages to the directory server 116, and particularly, the traffic for one or more deviations from usual patterns. As an example, if the MPI 118*a* usually sends 1000 transactions in a given hour and if there is a significant drop in the volume at any given time, the engine 122 determines, at 314, that the connectivity condition as abnormal. As another example, the MPI 118*a* may typically transmit between 60-100 authentication messages per minute. If the compliance engine 122, while monitoring the authentication messaging from the MPI 118*a*, does not receive an authentication message in 10 seconds, the compliance engine 122 determines, at 314, that an abnormal condition exists. In any case, when an abnormal condition is determined at 314, the compliance engine 122 generates a flag based on the condition, at 316.

Similarly, for example, the compliance engine 122 expects latency of the authentication messaging to satisfy one or more thresholds, where the thresholds are based on historical data and/or quality of service of the system 100, or a combination thereof, etc.

It should be appreciated that additional conditions related to the authentication messaging may also be monitored by the compliance engine 122 to determine performance of the MPI's 118 in the system 100.

Further in the method 300, the compliance engine 122 monitors, at 318, the response messaging from the ACS 120 (in response to authentication messages originating from the MPI's 118 and/or received from the directory server 116). The conditions determined for the ACS 120 may include, without limitation, whether no message has been received from the ACS 120 within a defined interval, whether the latency defined by the response messaging to the ACS 120 is above or below one or more defined thresholds, whether the verified or non-verified indicator in the response messaging fits an abnormal pattern, whether the ACS is inactive, etc.

In connection with the condition relating to whether the verified or non-verified indicator in the response messaging fits an abnormal pattern, such an abnormal pattern may be defined as an improbable authentication response based on typical response patterns over the course of a defined period. As an example, an abnormal pattern may comprise receipt of 100 concurrent positive authentications, when historical data indicates that a typical pattern for the ACS 120, over a course of 100 transactions, is 90 positive authentications. Thus, upon receipt of the 100 (or even 95, for example) concurrent positive authentications, the engine 122 may determine, at 320, that an abnormal condition exits. As another example, if the ACS 120 typically transmits response messages to the directory server 116 every 0.3 seconds, the compliance engine 122 may determine, at 320, that an abnormal condition exists, when no response is received in 1 second, 2 second, 5 seconds, 10 seconds, etc. It should be appreciated that the defined interval, for which no response message is received before determining an abnormal condition, may be selected to be any interval, but is often selected to promote prompt recognition of the abnormal condition, and also to minimize falsely determined abnormal conditions. In any case, if the abnormal condition is determined at 320, the compliance engine 122 generates a flag, at 316.

In another example, the compliance engine 122 expects latency of the response messaging to satisfy one or more thresholds, where the thresholds are based on historical data and/or quality of service of the system 100, or a combination thereof, etc.

In yet another example, the compliance engine 122 monitors the response messaging to determine if the pattern of verified and/or non-verified indicators in response messages is abnormal. Here, an abnormal pattern may be defined as an improbable authentication response based on typical response patterns over the course of a defined period. In particular, when the ACS 120 indicates verified in 100, 200, 500, or other number of consecutive response messages, the compliance engine 122 determines, at 320, that an abnormal condition exists when a typical pattern for the ACS 120, over a course of 100 transactions, is only 90 positive authentications. The engine 122 then generates a flag, at 316. Conversely, when the ACS 120 indicates non-verified in 10, 20, 100, or other number of consecutive response messages, the compliance engine 122 determines, at 320, that an abnormal condition exists, and then generates a flag, at 316. It should be appreciated that still other patterns may provide a basis for an abnormal condition, such as repeated, or periodic patterns of non-verified and verified indicators, etc.

After the compliance engine 122 generates the flag, it appends the flag to a log, at 322. The log may be defined as a data structure stored in memory associated with the compliance engine 122. For example, the data structure may be defined in memory 204, for example, of the directory server 116. The log may be organized by MPI and/or ACS, or temporally with most recent flags added to the top or bottom of the log, etc. In general, the flags appended to the log include time stamps, at which the flags were generated, certificate IDs (e.g., unique identifiers given to certificates to appropriately identify the secure connections between the payment network 106 and the MPI's 118 and/or the ACS 120, etc.), and summaries and/or descriptions of the conditions, upon which the flags were generated, etc. Further, the log, for each flag, includes an identifier for the particular MPI or ACS for which the flag was generated. It should be appreciated that a variety of information about the flag, the condition, the MPI, the ACS, the directory server, the consumer, the payment account, etc., may be included in the log.

In addition, depending on the condition which caused the flag to be generated, the flag may include a severity rating. The rating may indicate high severity, medium severity, or low severity (in numerical scores, word classifications, etc.), or various other measures of severity. For example, when the compliance engine 122 determines the MPI 118a has lost connectivity, the flag may be rated as severe, because consumer interactions with that MPI 118a are cut off from the enhanced authentication service associated with the payment devices 112. Conversely, if latency of the authentication messaging is above a lower threshold, but not above a higher threshold, the impact on the consumers 110 may be minor, and the flag may be rated as low severity.

Based on the severity rating, or not, the compliance engine 122 optionally (as indicated by the dotted lines in FIG. 3) transmits, at 324, the generated flag to one or more of the analyst users 124. In particular, for example, when a generated flag is rated severe, the compliance engine 122 may transmit the flag to the user 124 in real time (e.g., within 10 seconds, 30 seconds, 60 seconds, etc.), or near real time (e.g., within 5 minutes, 10 minutes, etc.), whereby the user 124 is permitted to take immediate action to remedy and/or investigate the condition, the MPI at issuer, and/or the ACS at issue, which led to the flag being generated. In this exemplary embodiment, the generated flag is transmitted to the user 124 at a portable communication device associated with the user 124, such as, for example, a pager, a smartphone, a cellular phone, a tablet, etc.

With continued reference to FIG. 3, the compliance engine 122 also optionally (as indicated by the dotted lines) generates, at 326, one or more reports (or scorecards) based on the log for the MPI's 118 and/or the ACS 120. Often, reports are generated by the compliance engine 122 specific to one of the MPI's 118 and/or the ACS 120 (or other ACS), such that the report may be distributed to the particular MPI and/or ACS. While specific to the MPI and/or ASC, the reports may include average statistics and/or metrics across multiple or all MPI's and/or ACS's within the system 100 or within a group of systems (related to, for example, latency, downtime, missed messages, etc.), whereby the individual MPI and/or ACS may be benchmarked against others. Further, the reports may be generated in a variety of regular or irregular intervals including, for example, every quarter, month, week, etc. Moreover, in this manner, the reports may be used, by the payment network 106, for example, to implement improvements, changes, alterations, and/or consequences to the MPI's and/or ACS's to improve authentication services. For example, the reports may provide a basis for the payment network 106 to impose and/or enforce certain criteria for the use by the payment network 106, and consequences when such criteria is not met by the MPI's and/or ACS's, etc.

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

It should be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of: (a) monitoring authentication messaging from a merchant plug-in (MPI) associated with at least one merchant, the authentication messaging related to one or more consumers attempting transactions to payment accounts at the at least one merchant; (b) for each authentication message received from the MPI, transmitting the authentication message to an access control server (ACS) when an issuer associated with the payment account at issue is a participant in an authentication service; (c) monitoring response messaging from the ACS, each response message associated with a transaction and generated in response to an authentication messages from the MPI; and (d) generating, by the computing device, at least one flag, when a condition associated with the authentication messages and/or the response messages is abnormal.

Example embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "connected to," or "coupled to" another element, it may be directly on, connected or coupled to the other element, or intervening elements may be present. In contrast, when an element is referred to as being "directly on," "directly connected to," or "directly coupled to" another element, there may be no intervening elements present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

What is claimed is:

1. A computer-implemented method for use in monitoring authentication messages in a payment network, the method comprising:

monitoring, by a computing device, authentication messaging from a merchant plug-in (MPI) associated with at least one merchant, the authentication messaging related to one or more consumers attempting transactions to payment accounts at the at least one merchant;

for each authentication message received from the MPI, transmitting the authentication message to an access control server (ACS) when an issuer associated with the payment account at issue is a participant in an authentication service;

monitoring, by the computing device, response messaging from the ACS, each response message associated with a transaction and generated in response to an authentication message from the MPI;

generating, by the computing device, at least one flag, when a condition associated with the authentication messaging and/or the response messaging is abnormal.

2. The method of claim 1, wherein the abnormal condition comprises the authentication messaging from the MPI including no message within a defined interval.

3. The method of claim 1, wherein the abnormal condition comprises a latency defined by the authentication messaging from the MPI failing to satisfy a predefined threshold.

4. The method of claim 1, wherein the abnormal condition comprises the response messaging from the ACS including no message within a defined interval.

5. The method of claim 1, wherein the abnormal condition comprises a latency defined by the response messaging from the ACS failing to satisfy a predefined threshold.

6. The method of claim 1, wherein the abnormal condition comprises the response messaging defining a pattern, the pattern including at least one of: more than 10 consecutive verified response messages without a non-verified response message and/or more than 5 consecutive non-verified response messages without a verified response message.

7. The method of claim 1, further comprising transmitting the at least one flag to a communication device associated with an analyst user associated with the payment network; and wherein the at least one flag includes an identifier of the MPI and/or the ACS, a time stamp, and an indication of the abnormal condition upon which the flag was generated.

8. The method of claim 7, further comprising appending the at least one flag to a log, stored in a directory server, associated with the MPI and/or the ACS.

9. The method of claim 8, wherein the at least one flag includes a severity rating, based on said abnormal condition.

10. A system for authenticating consumers as part of card-not-present transactions to a payment network, the system comprising:
- a directory server coupled to a merchant plug-in (MPI) and configured to receive authentication messaging from the MPI related to authentication of consumers, the authentication messaging associated with payment account transactions; and
- a compliance engine coupled to a data structure and configured, by executable instructions, to:
  - generate and append to a log in the data structure a flag when no authentication message has been received from the MPI in a first defined interval;
  - generate and append to the log in the data structure a flag when a latency defined by the authentication messaging received from the MPI fails to satisfy a defined first threshold; and
  - transmit the generated flag(s) to a user associated with the directory server, whereby the user is able to take action in view of the generated flag(s).

11. The system of claim 10, wherein the compliance engine is incorporated into the directory server.

12. The system of claim 11, wherein the compliance engine is further configured to generate a report, based on said log, for the MPI after a report interval.

13. The system of claim 10, wherein the compliance engine is configured to transmit the generated flag(s) to the user, in real time, or near-real time, when the flag(s) includes a high severity rating, but not when the flag(s) includes a low severity rating.

14. The system of claim 10, wherein the directory server is further coupled to an access control server (ACS) and configured to receive response messaging from the ACS related to authentication of the consumers, the response messaging associated with the payment account transactions; and
wherein the compliance engine is further configured to:
- generate and append to the log in the data structure a flag when the response messaging from the ACS includes no messages within a second defined interval;
- generate and append to the log in the data structure a flag when the response messaging received from the ACS fails to satisfy a second defined threshold; and
- generate and append to the log in the data structure a flag when a verified and/or non-verified indicator pattern of the response messaging received from the ACS defines an abnormal pattern.

15. The system of claim 14, wherein the transmitted flag(s) includes an identifier associated with the MPI and/or the ACS, which caused the flag(s) to be generated.

16. A system for authenticating consumers as part of card-not-present transactions to a payment network, the system comprising:
- a directory server coupled to an access control server (ACS) and configured to receive response messaging from the ACS related to authentication of consumers, the response messaging associated with payment account transactions; and
- a compliance engine configured, by executable instructions, to:
  - generate a flag when no response message has been received from the ACS in a first defined interval;
  - generate a flag when latency defined by the response messaging received from the ACS is greater than a predefined threshold; and
  - append the generated flag(s) to a log in memory associated with the compliance engine.

17. The system of claim 16, wherein the compliance engine is further configured to transmit the generated flag(s) to a user associated with the directory server.

18. The system of claim 17, wherein the directory server is configured to receive messaging from multiple ACS's related to authentication of multiple different consumers; and
wherein the generated flag(s) includes an identifier for a particular one of the ACS's which caused the flag(s) to be generated.

19. The system of claim 16, wherein the compliance engine is further configured to generate a flag when the messaging received from the ACS defines an abnormal verified and/or non-verified pattern.

20. The system of claim 16, wherein the compliance engine is implemented in a computing device separate from the directory server.

* * * * *